United States Patent
Ho et al.

(10) Patent No.: US 9,332,185 B2
(45) Date of Patent: May 3, 2016

(54) METHOD AND APPARATUS FOR REDUCING JITTERS OF VIDEO FRAMES

(71) Applicant: Faraday Technology Corp., Hsin-Chu (TW)

(72) Inventors: Hsiu-Wei Ho, Taichung (TW); Ho-Yi Chiang, Taichung (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 66 days.

(21) Appl. No.: 14/219,012

(22) Filed: Mar. 19, 2014

(65) Prior Publication Data

US 2015/0189182 A1   Jul. 2, 2015

(30) Foreign Application Priority Data

Dec. 26, 2013  (TW) .............................. 102148490 A (51) Int. Cl.

| H04N 5/228 | (2006.01) |
|---|---|
| H04N 5/14 | (2006.01) |
| H04N 9/64 | (2006.01) |
| H04N 7/12 | (2006.01) |
| H04N 11/02 | (2006.01) |
| H04N 11/04 | (2006.01) |
| H04N 5/232 | (2006.01) |
| G06T 5/00 | (2006.01) |
| G06T 5/40 | (2006.01) |
| G06T 7/20 | (2006.01) |

(52) U.S. Cl.
CPC ............ *H04N 5/23267* (2013.01); *G06T 5/002* (2013.01); *G06T 5/40* (2013.01); *G06T 7/202* (2013.01); *H04N 5/23254* (2013.01); *G06T 2207/10016* (2013.01); *G06T 2207/20016* (2013.01); *G06T 2207/20021* (2013.01); *G06T 2207/20076* (2013.01)

(58) Field of Classification Search
CPC ....................... H04N 5/23254; H04N 5/23267
USPC ......... 348/169–172, 497–499, 208.1–208.99, 348/402.1–418.1; 382/107
See application file for complete search history.

(56) References Cited

U.S. PATENT DOCUMENTS

| 5,886,744 | A | 3/1999 | Hannah |
|---|---|---|---|
| 2006/0066728 | A1* | 3/2006 | Batur ....................... 348/208.99 |
| 2009/0237516 | A1* | 9/2009 | Jayachandra et al. ..... 348/208.4 |
| 2010/0260257 | A1* | 10/2010 | Zhou et al. ............... 375/240.03 |
| 2013/0286241 | A1* | 10/2013 | Spampinato et al. ...... 348/222.1 |

FOREIGN PATENT DOCUMENTS

| TW | 200627315 | 8/2006 |
|---|---|---|
| TW | 201026023 | 7/2010 |
| TW | 201325259 | 6/2013 |

OTHER PUBLICATIONS

"Office Action of Taiwan Counterpart Application," issued on Aug. 12, 2015, p. 1-7.

* cited by examiner

*Primary Examiner* — Chia-Wei A Chen
(74) *Attorney, Agent, or Firm* — Winston Hsu; Scott Margo

(57) ABSTRACT

A method for reducing the jitters of video frames is provided, which includes the steps of dividing a frame into multiple blocks, selecting at least one block according to a variance of each block, determining a global motion vector of the frame in a direction according to the selected block(s), and performing motion compensation on the frame in the direction according to the global motion vector.

18 Claims, 5 Drawing Sheets

METHOD AND APPARATUS FOR REDUCING JITTERS OF VIDEO FRAMES

CROSS-REFERENCE TO RELATED APPLICATION

This application claims the priority benefit of Taiwan application serial no. 102148490, filed on Dec. 26, 2013. The entirety of the above-mentioned patent application is hereby incorporated by reference herein and made a part of this specification.

BACKGROUND OF THE INVENTION

1. Field of the Invention

The invention generally relates to a method and an apparatus for processing the video frames, in particular, to a method and an apparatus for reducing jitters of video frames.

2. Description of Related Art

The video frames captured by a handheld device like a digital camera, a digital V8, or a mobile phone may have jitters unavoidably for the instability of the hands of people. Besides, the video frames captured by a vehicle operation recorder used in a car may also have jitters because of the instability of the driving. There are two solutions that can solve the problems of the jitters of the video frames now.

The first solution is the optical image stabilization (OIS) technique. The technique detects the motion of the image capturing device by using a motion sensor like a gyroscope and then moves a lens or an image sensor by using an actuator like a voice coil motor (VCM) to compensate the motion of the image capturing device.

The second solution is the electronic image stabilization (EIS) technique. The technique estimates and compensates the motion of the image capturing device by means of an algorithm performed by software or hardware. For economizing the use of the motion sensor and the actuator, the cost of the electronic image stabilization technique is lower than that of the optical image stabilization technique.

SUMMARY OF THE INVENTION

Accordingly, a method and an apparatus for reducing jitters of video frames are provided in the embodiments of the invention to solve the problems of the jitters of the video frames of an image capturing device.

The method for reducing jitters of video frames of an embodiment of the invention includes the following steps: dividing a frame into multiple blocks, selecting at least one of the blocks according to a variance of each of the blocks, determining a global motion vector of the frame in a direction according to the selected block, and performing motion compensation on the frame in the direction according to the global motion vector.

The apparatus for reducing jitters of video frames in an embodiment of the invention includes a storage device and a processor. The storage device is configured to store the frames. The processor is coupled to the storage device, and configured to perform the method for reducing the jitters of the video frames.

Based on the above, a more efficient and more actual solution is provided in the embodiments of the invention, such that the video frames captured by the image capturing device can be more stable.

In order to make the aforementioned and other features and advantages of the invention comprehensible, several exemplary embodiments accompanied with figures are described in detail below.

DESCRIPTION OF THE EMBODIMENTS

Figure 1:
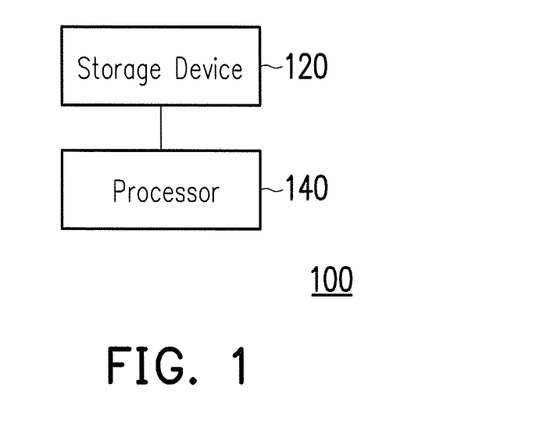
FIG. 1 is a diagram illustrating an apparatus for reducing the jitters of the video frames according to an embodiment of the invention.

FIG. 1 is a diagram illustrating an apparatus 100 for reducing the jitters of the video frames according to an embodiment of the invention. The apparatus 100 includes a storage device 120 and a processor 140. The processor 140 is coupled to the storage device 120. The processor 140 can reduce the jitters of the video frames by performing a method shown in FIG. 2, FIG. 3 and FIG. 9. The video may be captured by a handheld device like a digital camera, a digital V8, or a mobile phone or the video may be captured by an image capturing device like a vehicle operation recorder. The storage device 120 can be configured to store the aforementioned video and all values and data required or generated by the method mentioned above.

Figure 2:
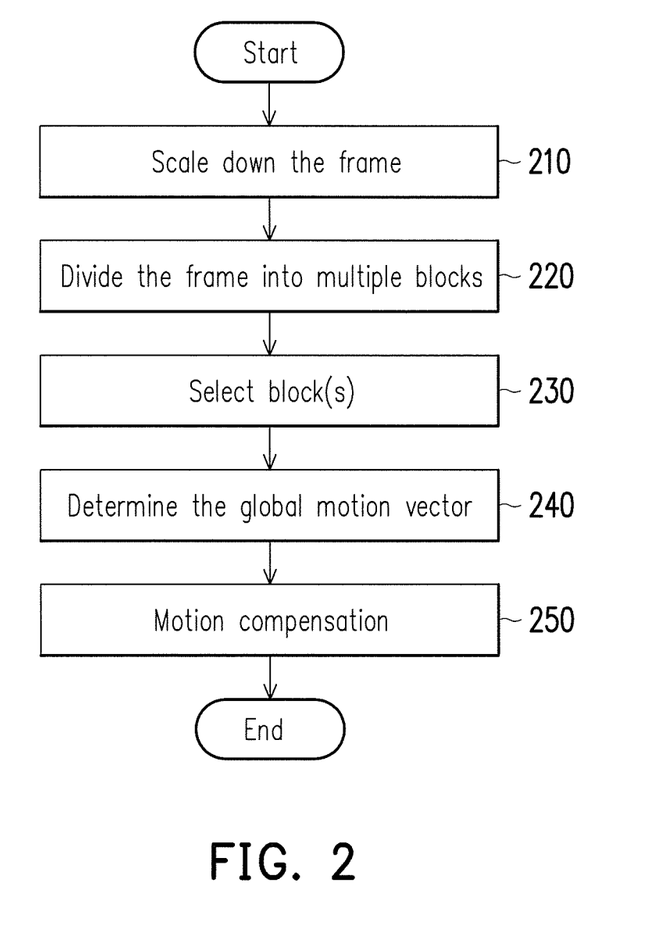
FIG. 2 and FIG. 3 are flowcharts illustrating a method for reducing the jitters of the video frames according to an embodiment of the invention.

FIG. 2 is a flowchart illustrating a method for reducing the jitters of the video frames according to an embodiment of the invention. The processor 140 performs the process shown in FIG. 2 on each frame of the video. The video frame that is processed currently by the process of FIG. 2 is called the current frame below. In order to reduce the requirement of the calculation and the storage, the method for reducing the jitters of the video frames of FIG. 2 can only use the intensity component (or the luminance component) of the current frame instead of using the other components of the current frame.

The process of FIG. 2 is described as below. First, scaling down the current frame in step 210 to reduce the requirement of the calculation and the storage. Each frame is a two-dimensional array composed of multiple pixels, and the two-dimensional array includes two directions that are horizontal and vertical. In step 210, the current frame can be scaled down by using the same ratio or the different ratios in the two directions. Step 210 can be omitted if it is not necessary to reduce the requirement of the calculation and storage. In step 220, dividing the current frame into multiple blocks that are not overlapping to each other. For instance, each block may be a square with 16 pixels on each side.

In step 230, using the following formula (1) to calculate a variance of each block.

$$\sigma_i = \frac{1}{mn} \sum_P |y_P - \bar{y}| \quad (1)$$

In the formula (1), $\sigma_i$ is the variance of the $i^{th}$ block, m and n are the length and the width of the block respectively, $y_p$ is the intensity value of the position p of the block, i.e., the intensity component mentioned above, and $\bar{y}$ is the average value of the intensity component of the block. The position mentioned above indicates the position of the pixel in the frame. After that, compare the variance of each block with a default threshold value and select each block whose variance is larger than or equal to the threshold value. The blocks that are not selected will be discarded and not used in the following steps of the method. The purpose of the step 230 is to discard the blocks of the flat region of the current frame because the flat region may generate unreliable motion vectors easily in the motion estimation.

Then determining the global motion vector of the current frame according to the selected blocks in step 240. Performing the motion compensation on the current frame according to the global motion vector in step 250.

Figure 3:
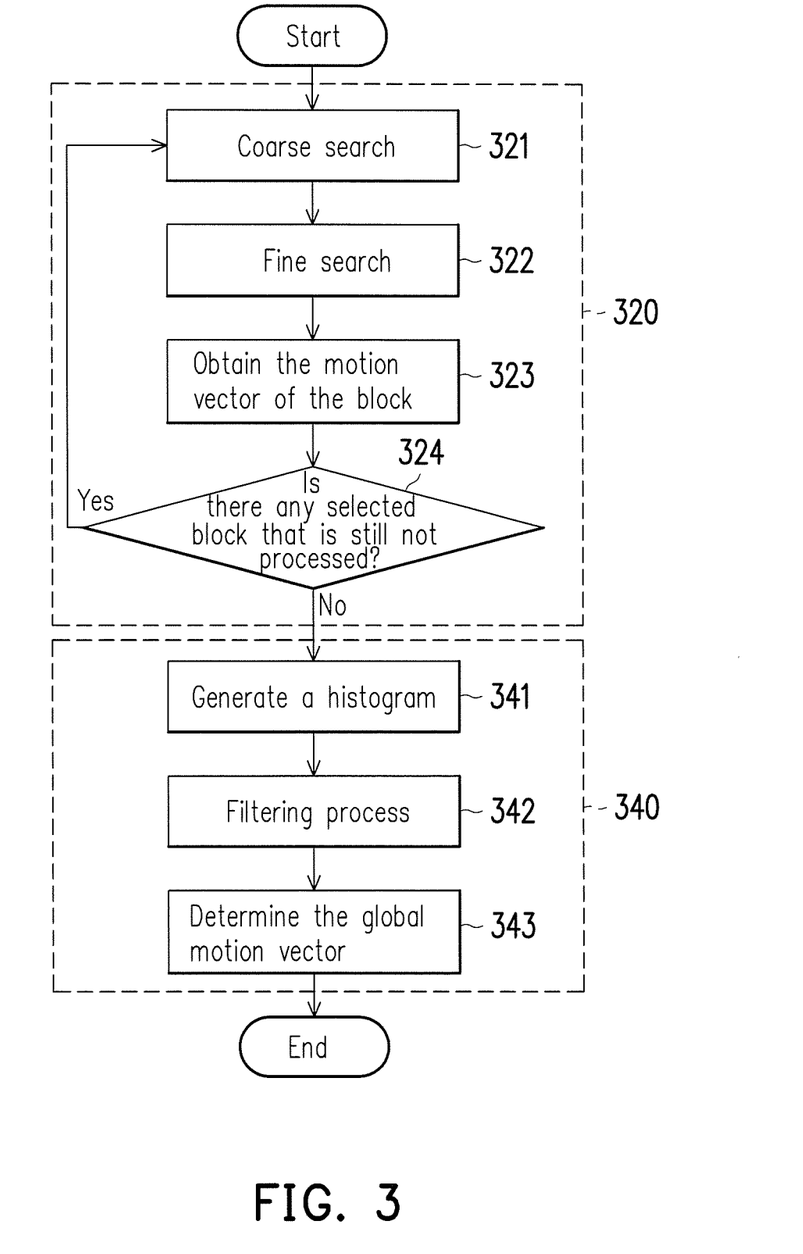

FIG. 3 is the detailed flowchart of step 240. Step 240 may be divided into two portions, i.e., the block motion estimation 320 and the global motion estimation 340. The block motion estimation 320 includes steps 321 to 324, and the global motion estimation 340 includes steps 341 to 343.

The block motion estimation 320 obtains the motion vector of each selected block by performing the motion estimation on each selected block according to the current frame and the previous frame of the video mentioned above. The selected block that is performing the block motion estimation 320 currently is called the current block below. Because the frames of the video are arranged according to the time sequence, the time sequence of the previous frame is previous to that of the current frame.

Figure 4:
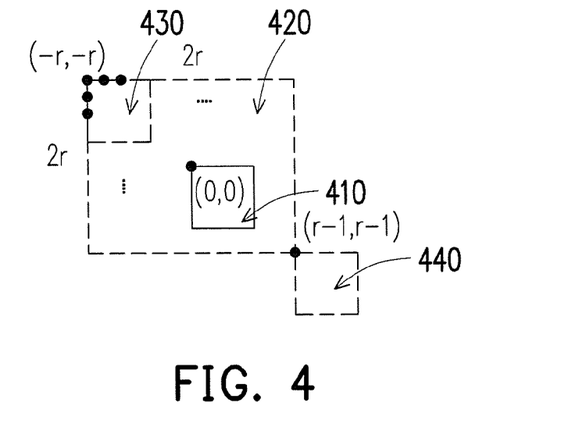
FIG. 4, FIG. 5 and FIG. 6 are diagrams illustrating motion estimation of a block according to an embodiment of the invention.
Figure 5:
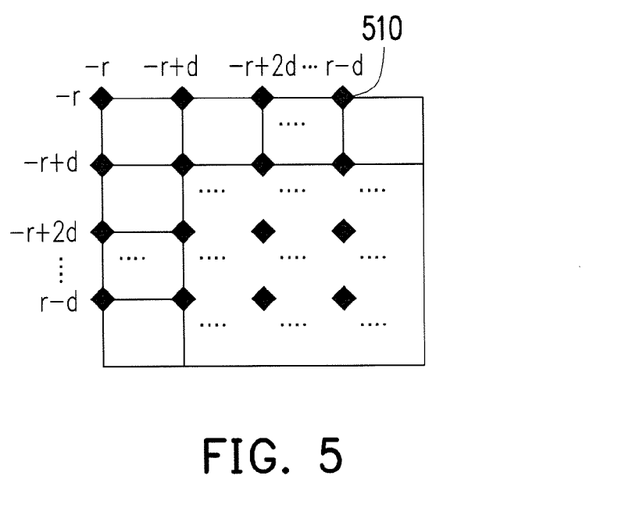

The block motion estimation 320 is described as below. First, in step 321, performing the coarse search on an area whose size is 2r×2r pixels around the current block of the previous frame, wherein r is a default parameter. As shown in FIG. 4, if the upper left corner point of the current block 410 is the original point, the coordinate of the upper left corner point of the area 420 mentioned above is (−r,−r) and the coordinate of the bottom right corner point of the area 420 is (r−1,r−1). The coarse search of step 320 only searches the multiple positions whose interval is d in the area 420 to find out k best matched positions of the multiple positions mentioned above, wherein d and k are both default values. FIG. 5 marks the aforementioned multiple searching positions with rhombuses, such as the position 510, and these positions are arranged in the form of a grid according to a fixed interval d.

Performing a search on a position means that comparing the current block of the current frame with the block of the same size of the previous frame, wherein the upper left corner point of the block of the previous frame is located on the position. For instance, performing the search on the position (−r,−r) is to compare the current block 410 of the current frame with the block 430 of the previous frame, and performing the search on the position (r−1,r−1) is to compare the current block 410 of the current frame with the block 440 of the previous frame. The comparison of the two blocks mentioned above may use any existing algorithm, such as sum of absolution difference (SAD) or local binary pattern (LBP).

Figure 6:
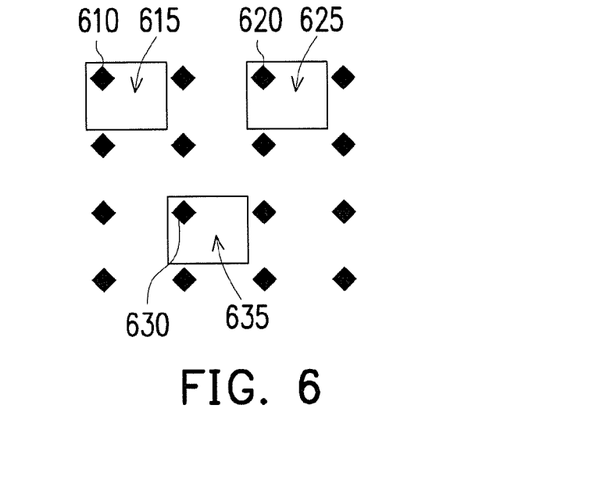

Then performing the fine search in step 322. As shown in FIG. 6, assuming that k is 3, and positions 610, 620, and 630 are the three best matched positions of the multiple searching positions of FIG. 5. The fine search of step 322 is to search each position of areas 615, 625, and 635 (i.e., the position of each pixel) to find out one best matched position of the $kd^2$ positions of the areas 615, 625, and 635. The areas 615, 625, and 635 correspond to the positions 610, 620, and 630 respectively and include the positions 610, 620, and 630 respectively. The areas 615, 625, and 635 are all squares with the edge length of d pixels, so each of the areas 615, 625, and 635 includes $d^2$ searching positions respectively.

The coarse search of step 321 and the fine search of step 322 may use the same block comparison algorithm or different block comparison algorithms. For instance, the coarse search of step 321 may use SAD to speed the comparison, while the fine search of step 322 may use LBP to increase the precision of the comparison.

Then obtaining a motion vector (u,v) of the current block in step 323, and the motion vector is the vector that is from the upper left corner point of the current block to the best matched position that is obtained finally in the fine search of step 322.

Then checking if there is any selected block of the current frame that is still not processed in step 324. If yes, the process is back to step 321, and specifying the next selected block that is not processed as the current block. If no, the process proceeds to the global motion estimation 340.

The global motion estimation 340 is performed on two directions, the horizontal direction and the vertical direction, of the current frame respectively, and the global motion estimations 340 of the two directions are independent to each other. If there is a special application environment that the jitters of the video frames only occur in one direction, the global motion estimation 340 can only be performed on the direction. The following description only takes one of the horizontal direction and the vertical direction (i.e., the current direction below) as a case, and the portion of the other direction may be deduced by analogy.

Figure 7:
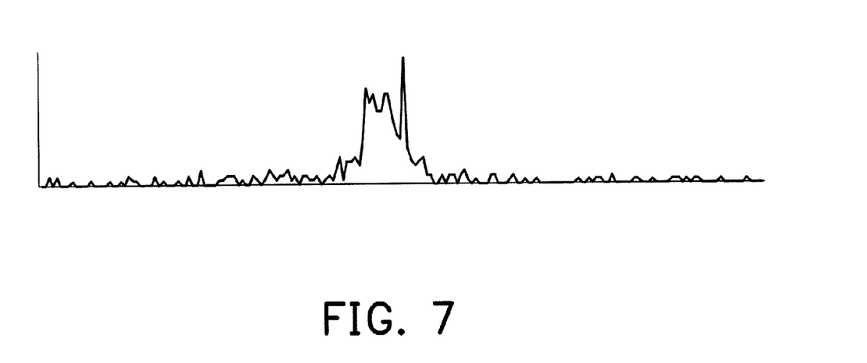
FIG. 7 and FIG. 8 are diagrams illustrating a global motion vector according to an embodiment of the invention.

After proceeding to the global motion estimation 340, generating a histogram of the motion vectors of the selected blocks mentioned above in the current direction in step 341. The histogram has 2r bins. From the area 420 of FIG. 4, it shows that the value range of the component of the motion vectors of all the selected blocks in the current direction is from −r to r−1, and there are total 2r different values. Each bin of the histogram corresponds to one of the values, and serves to accumulate the occurrence frequencies of the corresponding value. Checking the motion vector of each selected block in step 341. If the component of the motion vector $(u_i,v_i)$ of the $i^{th}$ block in the current direction is $u_i$, the accumulated value of the bin corresponding to the value $u_i$ is added by 1. After checking each of the selected blocks, the histogram of the current direction is obtained. Such as an example of a histogram shown in FIG. 7, the horizontal axis of FIG. 7 is the range of the value mentioned above, and the vertical axis indicates the accumulated value of each bin.

Figure 8:
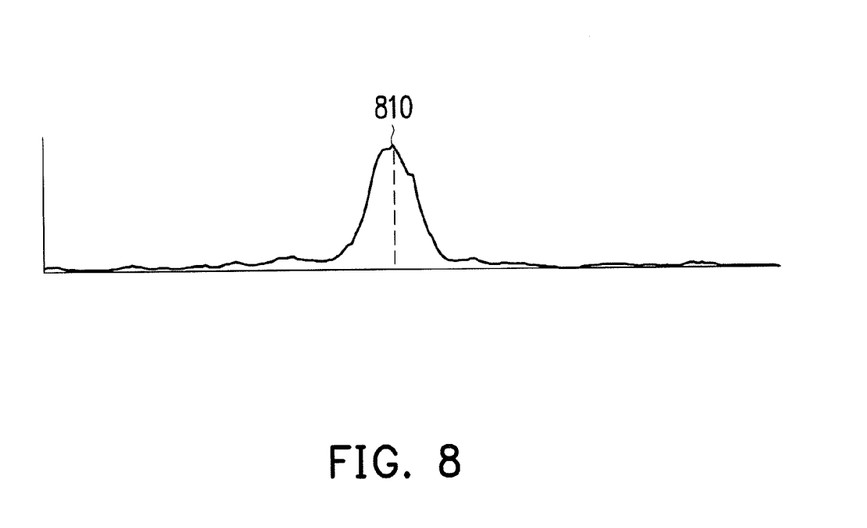

After that, using a low pass filter on the histogram to reduce the noise in step 342 such that the histogram is smoothed. For example, a low pass filter like a Gaussian filter or a mean filter may be used, and FIG. 8 is the histogram obtained by using the Gaussian filter on the histogram of FIG. 7.

After that, determining the global motion vector of the current frame in the current direction according to the position of the peak value of the histogram in step 343. The said peak value is the maximum value of the accumulated values of every bin of the histogram. Taking the histogram of FIG. 8 as an example, the global motion vector of the current direction is the corresponding value of the peak value 810 on the horizontal axis. Such a global motion vector is only the component of the real global motion vector of the current frame in the current direction. The real global motion vector of the current frame can be obtained by merging the components of the two directions.

Figure 9:
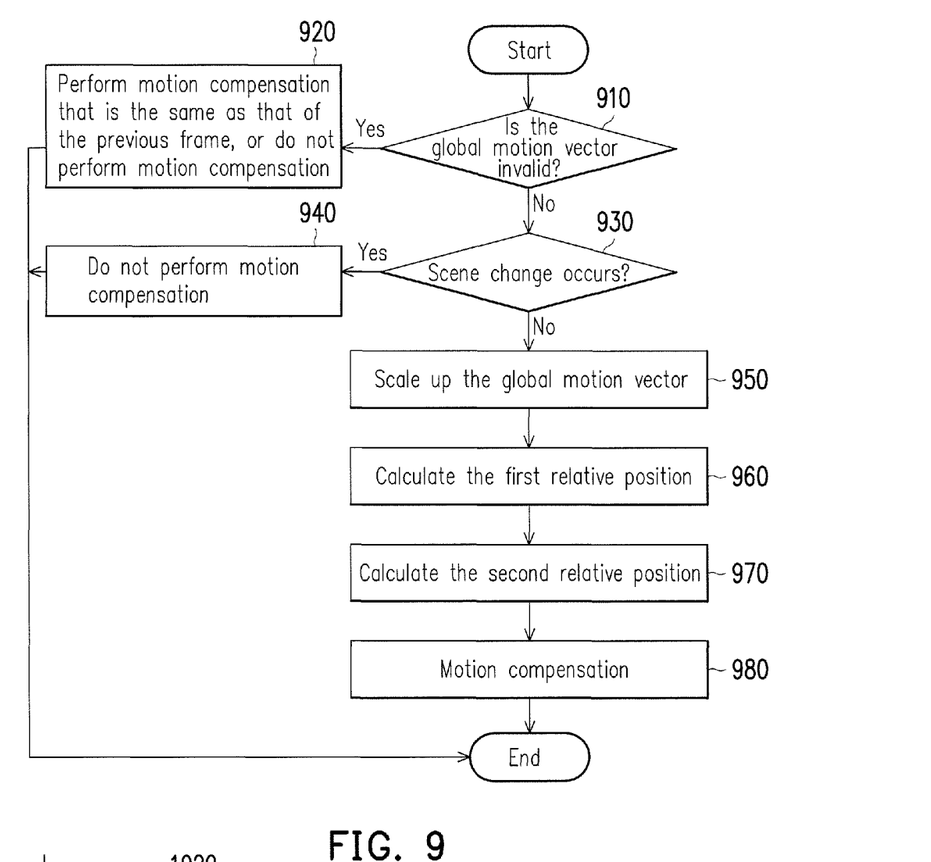
FIG. 9 is a flowchart illustrating a method for reducing the jitters of the video frames according to an embodiment of the invention.

FIG. 9 is a detailed flowchart of step 250 according to an embodiment of the invention. The motion compensation of FIG. 9 is performed once on each frame of the video. The motion compensation of FIG. 9 is also performed respectively on the horizontal direction and the vertical direction of the current frame, and the motion compensations of the two directions are independent to each other. If there is a special application environment that the jitters of the video frames only occur in one direction, the motion compensation of FIG. 9 can only be performed on the direction. The following description only takes one of the horizontal direction and the vertical direction (i.e., the current direction below) as a case, and the portion of the other direction may be deduced by analogy.

First, checking whether the global motion vector of the current frame in the current direction is invalid or not in step 910. Calculating the variance of the histogram of the current direction by means of the formula (2) below.

$$\sigma_h = \frac{1}{N} \sum_{j=1}^{2r} h_j |j - \bar{u}| \qquad (2)$$

In the formula (2), $\sigma_h$ is the variance of the histogram of the current direction, N is the number of the selected block, $h_j$ is the accumulated value of the $j^{th}$ bin of the histogram, and $$\bar{u} = \frac{1}{N} \sum_{j=1}^{2r} h_j j.$$

If the variance $\sigma_h$ of the histogram is larger than one default threshold value and the peak value of the histogram is smaller than the other default threshold value, determining that the global motion vector of the current frame in the current direction is invalid, otherwise determining that the aforementioned global motion vector is valid. The invalid global motion vectors often occur in the frame that has large flat areas or duplicate texture patterns, and the histogram of such frame often does not have an obvious peak value, so the variance of the histogram can be served to detect this type of the frame.

If the global motion vector is invalid, the process proceeds to step 920, performing motion compensation that is the same as that of the previous frame on the current frame in the current direction (that is to perform motion compensation by means of the same motion compensation vector), or not performing motion compensation on the current frame in the current direction. If the global motion vector is valid, checking if scene change occurs in the current frame of the video in step 930. The said scene change indicates a case that the difference between the current frame and the previous frame is very large, for instance, a big object, such as a car and so on, passes through the front of the photograph lens, or the photograph lens is panning rapidly, so the motion compensation should not be performed at the moment. The scene change can be detected according to the value of the global motion vector of the current frame in the current direction. If the aforementioned global motion vector is larger than a default threshold value, determining that the scene change occurs, otherwise determining that no scene change occurs. If the scene change occurs, the process proceeds to step 940, such that the motion compensation is not performed on the current frame in the current direction. If no scene change occurs, the process proceeds to step 950.

In step 950, scaling up the global motion vector of the current frame in the current direction according to the scaling down ratio of the current frame in the current direction in step 210, and performing the motion compensation of the current frame in the current direction by means of the scaled up global motion vector mentioned above in the following steps. If step 210 is omitted, the step 950 should also be omitted.

In step 960, calculating a first relative position of each frame of a continuous frame group in the current direction. The first relative position is the position of the corresponding frame relative to the photograph lens before motion compensation. The video starts from the first frame, the current frame is the $i^{th}$ frame of the video, the continuous frame group is composed of each of the frames from the $(i-s)^{th}$ frame to the $(i+t)^{th}$ frame of the video, and s and t are the default integers. The continuous frame group also includes the current frame. The first relative position $l_i$ of the current frame can be calculated by means of the following formula (3) and that of the other frames may be deduced by analogy.

$$l_i = \sum_{j=1}^{i} g_j = l_{i-1} + g_i \qquad (3)$$

In the formula (3), $l_{i-1}$ is the first relative position of the previous frame in the current direction, $g_i$ is the global motion vector of the current frame in the current direction, and $g_j$ is the global motion vector of the $j^{th}$ frame of the video in the current direction. From the formula (3), it shows that the first relative position of a frame is the accumulated result of the globe motion vector of each frame from the first frame of the video to that frame of the video in the current direction.

After that, calculating a second relative position $l'_i$ of the current frame in the current direction by means of the following formula (4) in step 970. The second relative position is the position of the corresponding frame relative to the photograph lens after motion compensation.

$$l'_i = \frac{1}{s+1+t} \sum_{j=i-s}^{i+t} l_j \qquad (4)$$

$l_j$ of the formula (4) is the first relative position of the $j^{th}$ frame of the video in the current direction. From the formula (4), it shows that the second relative position $l'_i$ of the current frame in the current direction is the average value of the first relative positions $l_j$ of each frame of the continuous frame group in the current direction.

After that, performing the motion compensation of the current frame by means of the motion compensation vector of the current frame in the current direction in step 980, and that is to shift the cropping window of the current frame according to the motion compensation vector. The aforementioned motion compensation vector is equal to $l'_i - l_i$, and that is to subtract the first relative position from the second relative position of the current frame in the current direction.

Figure 10:
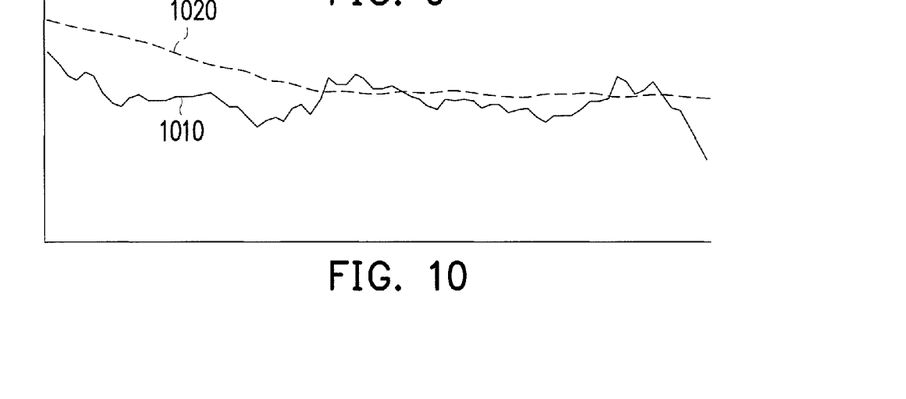
FIG. 10 is a diagram illustrating motion compensation for reducing the jitters of the video frames according to an embodiment of the invention.

FIG. 10 is a diagram illustrating motion compensation of the video frames according to an embodiment of the invention. The horizontal axis of FIG. 10 is the frame number of the video, it is also regarded as the time axis, and the vertical axis is the positions of the video frames. The frame position before performing motion compensation is marked 1010, and the frame position after performing motion compensation is marked 1020. From FIG. 10, it shows that the motion compensation of an embodiment of the invention can reduce the jitters of the video frames.

Based on the above, in an embodiment of the invention, only the blocks that are not in the flat area are selected to avoid the unreliable motion vectors, the smoothed filtering is performed on the histogram of the motion vector to obtain the stable global motion vector, and the variance of the histogram is served to detect the invalid global motion vector, therefore the jitters of the video frames can be reduced, such that the video frames are more stable. Besides, in an embodiment of the invention, the two-stage search that performs from the coarse search to the fine search is used in the motion estimation of the block, and that is helpful to design the hardware more efficiently and more feasibly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for reducing jitters of video frames, comprising:
    dividing a first frame into a plurality of blocks;
    selecting at least one of the plurality of blocks according to a variance of each of the plurality of blocks;
    determining a global motion vector of the first frame in a direction according to the at least one selected block; and
    performing motion compensation on the first frame according to the global motion vector in the direction,
    wherein the first frame is one of a plurality of frames of a video, the video starts from a second frame, and the step of performing motion compensation on the first frame comprises:
        calculating a first relative position of each third frame of a continuous frame group which includes the first frame of the video in the direction, wherein the first relative position is generated according to the global motion vector of each of the frames from the second frame to the third frame of the video;
        calculating a second relative position of the first frame in the direction according to the first relative position of each of the third frames; and
        performing motion compensation on the first frame according to the first relative position and the second relative position of the first frame.

2. The method for reducing jitters of video frames according to claim 1, wherein the method for reducing jitters of video frames only uses an intensity component of the first frame, instead of using rest components of the first frame.

3. The method for reducing jitters of video frames according to claim 1, before dividing the first frame, further comprising:
    scaling down the first frame in the direction according to a ratio;
    and the step of performing motion compensation on the first frame comprising:
        scaling up the global motion vector according to the ratio; and
        performing motion compensation on the first frame in the direction according to the global motion vector which is scaled up.

4. The method for reducing jitters of video frames according to claim 1, wherein the step of selecting at least one of the plurality of blocks according to the variance of each of the plurality of blocks comprises:
    selecting each said block whose variance is larger than or equal to a threshold value.

5. The method for reducing jitters of video frames according to claim 1, wherein the step of determining the global motion vector according to the at least one selected block comprises:
    performing motion estimation on each of the at least one selected block according to the first frame and a fourth frame to obtain a motion vector of each of the at least one selected block, wherein a time sequence of the fourth frame is previous to that of the first frame;
    generating a histogram of the motion vector of the at least one selected block in the direction; and
    using a low pass filter on the histogram and then determining the global motion vector according to the histogram.

6. The method for reducing jitters of video frames according to claim 5, wherein the step of obtaining the motion vector of each of the at least one selected block comprises:
    searching a plurality of first positions of a first area around the selected block of the fourth frame to find out a default number of best matched positions of the plurality of first positions, wherein the plurality of first positions are arranged in a form of a grid according to a fixed interval;
    for each of the best matched positions, searching each of a plurality of second positions of a second area including the best matched position to find out a best matched position of the plurality of second positions, wherein an edge length of the second area is the fixed interval; and
    obtaining the motion vector of the selected block according to the best matched position of the plurality of second positions.

7. The method for reducing jitters of video frames according to claim 5, after using the low pass filter on the histogram, further comprising:
    determining the global motion vector according to a position of a peak value of the histogram.

8. The method for reducing jitters of video frames according to claim 5, further comprising:
    if a variance of the histogram is larger than a first threshold value and a peak value of the histogram is smaller than a second threshold value, performing motion compensation that is the same as that of the fourth frame on the first frame in the direction, or not performing motion compensation on the first frame in the direction.

9. The method for reducing jitters of video frames according to claim 5, further comprising:
    if the global motion vector is larger than a threshold value, not performing motion compensation on the first frame in the direction.

10. An apparatus for reducing jitters of video frames, comprising:
    a storage device, configured to store a first frame; and
    a processor, coupled to the storage device, configured to divide the first frame into a plurality of blocks, configured to select at least one of the plurality of blocks according to a variance of each of the plurality of blocks, configured to determine a global motion vector of the first frame in a direction according to the at least one selected block, and configured to perform motion compensation on the first frame in the direction according to the global motion vector,
    wherein the first frame is one of a plurality of frames of a video, the video starts from a second frame, the storage device is configured to store the video, and the processor is configured to calculate a first relative position of each third frame of a continuous frame group which includes the first frame of the video in the direction, wherein the first relative position is generated according to the global motion vector of each of the frames from the second frame to the third frame of the video; the processor is configured to calculate a second relative position of the first frame in the direction according to the first relative position of each of the third frames and performs motion compensation on the first frame according to the first relative position and the second relative position of the first frame.

11. The apparatus for reducing jitters of video frames according to claim 10, wherein the apparatus for reducing jitters of video frames only uses an intensity component of the first frame, instead of using rest components of the first frame.

12. The apparatus for reducing jitters of video frames according to claim 10, wherein the processor scales down the first frame in the direction according to a ratio before dividing the first frame, and the processor scales up the global motion vector according to the ratio and performs motion compensation on the first frame in the direction according to the global motion vector which is scaled up.

13. The apparatus for reducing jitters of video frames according to claim 10, wherein the processor selects each said block whose variance is larger than or equal to a threshold value.

14. The apparatus for reducing jitters of video frames according to claim 10, wherein the processor performs motion estimation on each of the at least one selected block according to the first frame and a fourth frame to obtain a motion vector of each of the at least one selected block, a time sequence of the fourth frame is previous to that of the first frame, and the processor generates a histogram of the motion vector of the at least one selected block in the direction, uses a low pass filter on the histogram, and then determines the global motion vector according to the histogram.

15. The apparatus for reducing jitters of video frames according to claim 14, wherein, for each of the at least one selected block, the processor searches a plurality of first positions of a first area around the selected block of the fourth frame to find out a default number of best matched positions of the plurality of first positions, and the plurality of first positions are arranged in a form of a grid according to a fixed interval; for each of the best matched positions, the processor searches each of a plurality of second positions of a second area that includes the best matched position to find out a best matched position of the plurality of second positions, and an edge length of the second area is the fixed interval; and the processor obtains the motion vector of the selected block according to the best matched position of the plurality of second positions.

16. The apparatus for reducing jitters of video frames according to claim 14, wherein the processor determines the global motion vector according to a position of a peak value of the histogram after using the low pass filter on the histogram.

17. The apparatus for reducing jitters of video frames according to claim 14, wherein if a variance of the histogram is larger than a first threshold value and a peak value of the histogram is smaller than a second threshold value, the processor performs motion compensation that is the same as that of the fourth frame on the first frame in the direction, or the processor does not perform motion compensation on the first frame in the direction.

18. The apparatus for reducing jitters of video frames according to claim 14, wherein if the global motion vector is larger than a threshold value, the processor does not perform motion compensation on the first frame in the direction.

* * * * *